Figure 1:
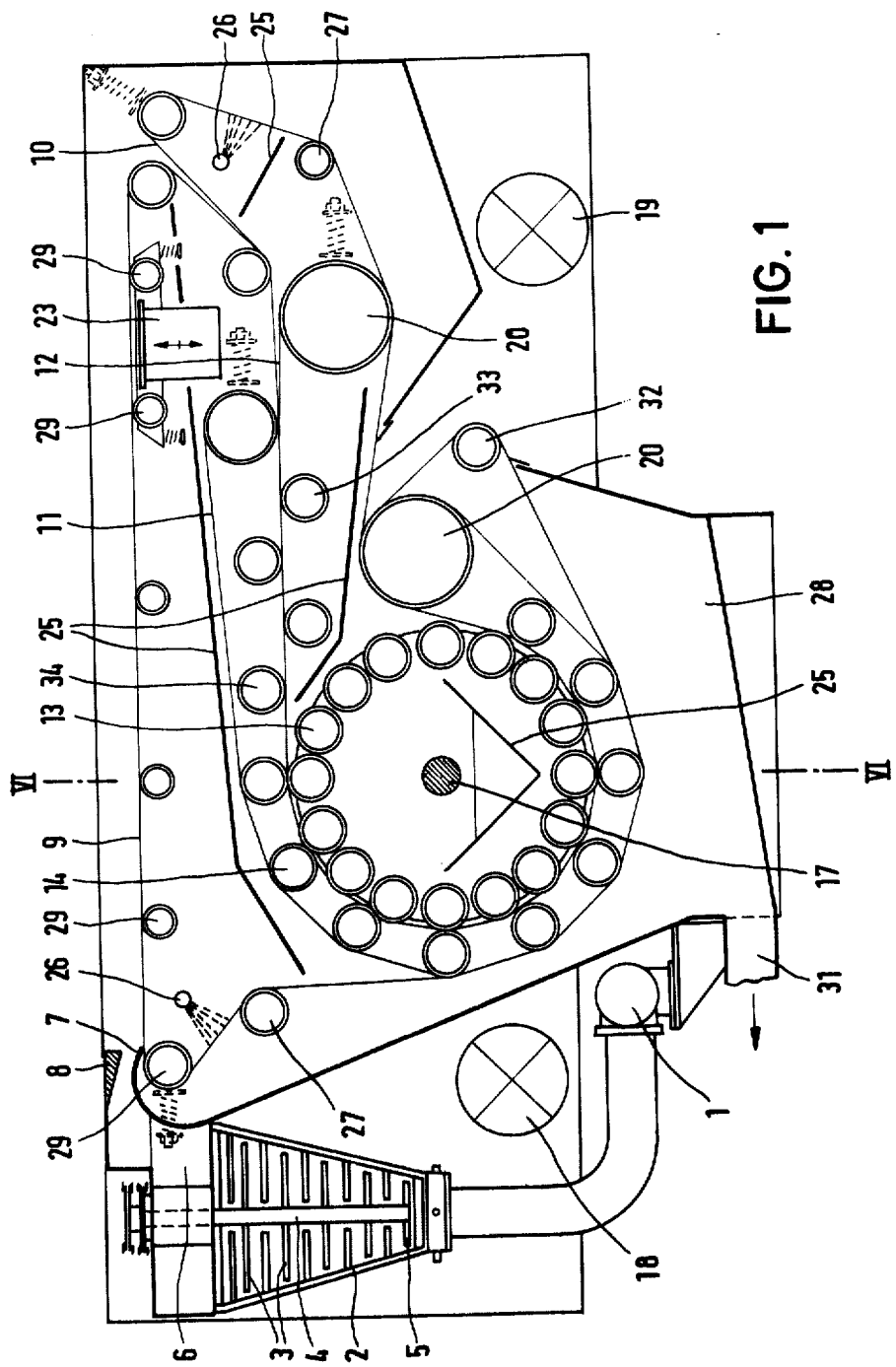

United States Patent [19]

Bähr

[11] 3,896,030

[45] *July 22, 1975

[54] FILTER PRESS, PARTICULARLY FOR DEWATERING SLUDGE IN SEWAGE TREATMENT PLANTS

[76] Inventor: Albert Bähr, Parallelstrasse 2a, D-6683 Elversberg, Saar, Germany

[ * ] Notice: The portion of the term of this patent subsequent to July 3, 1990, has been disclaimed.

[22] Filed: May 28, 1974

[21] Appl. No.: 473,589

[30] Foreign Application Priority Data

Aug. 28, 1973 Germany............................ 2343324

[52] U.S. Cl. ................ 210/384; 100/118; 210/386; 210/401
[51] Int. Cl............................................ B01d 33/14
[58] Field of Search ............ 210/77, 384, 386, 401; 100/112, 118

[56] References Cited

UNITED STATES PATENTS

| | | | |
|---|---|---|---|
| 2,104,785 | 1/1938 | Akeyson | 210/384 X |
| 2,874,848 | 2/1959 | Cannon et al. | 210/384 X |
| 2,963,158 | 12/1960 | Jung | 210/384 X |
| 3,613,564 | 10/1971 | Adamski et al. | 210/386 |
| 3,703,963 | 11/1972 | Eguchi | 210/386 |
| 3,743,100 | 7/1973 | Bahr | 210/401 |

Primary Examiner—Theodore A. Granger
Attorney, Agent, or Firm—Robert H. Jacob

[57] ABSTRACT

Apparatus for dewatering sludge in sewage treatment plants by means of a filter press having belts one at least of which is a filter belt, the sludge being conveyed around a drum between belts both of which pass around the drum the sludge being squeezed between the belts as it is conveyed around the drum by the belts.

12 Claims, 6 Drawing Figures

FILTER PRESS, PARTICULARLY FOR DEWATERING SLUDGE IN SEWAGE TREATMENT PLANTS

It is known to dewater sewage sludge, after adding organic or inorganic filtering aids, by means of a moving-belt filter press which has a horizontal filter belt over which there is superposed a pressure belt.

This known arrangement is comparatively massive and complex in construction and has the particular disadvantage that it is necessary to provide special arrangements to prevent the two belts from wandering sideways. The filtering efficiency of these known machines is often unsatisfactory and they occupy a great deal of space for a given material handling capacity.

Also known are tower presses in which two filter belts are brought together vertically under pressure. These known presses have the advantage that both belts are used for filtering, whereas in the arrangement mentioned just above only one belt is a filter belt. The tower presses are however costly in construction and they make it necessary to remove the filtrate continuously through the entire construction. Moreover, filtering efficiencies are not always satisfactory and particular difficulties are encountered in sealing the two filter belts along their edges.

From the German Patent Specification 732,587 a filter press is known for dewatering various kinds of materials, having two filter belts which circulate together, guided in concentric paths, around a rotary drum against which they are pressed by adjustable pressure rollers. The material is fed between the two filter belts. For dewatering ribbons of fibrous material the drum, which can be of cellular construction, is put under subatmospheric pressure in order to obtain sufficient dewatering. The application of vacuum for improving dewatering efficiency is however costly and is consequently excluded in the dewatering of low-value materials, for example sewage sludge. The German Pat. No. 1,030,184 describes a drum press for expelling the liquid phase from substances such as fruit or the like. Two filter belts circulate together, guided in concentric paths, around an inner rotary drum. This drum is hollow and has a flexible wall. The interior is under pressure. A filter press of this known kind is also very costly in construction. A particular disadvantage is that the drum wall is subjected to very high and sustained stresses Moreover the surface of the drum cannot be used for filtering.

Finally a drum filter is known from the U.S. Pat. No. 1,570,374, in which a rotary drum is surrounded by a system of suction rollers. This known filter is also costly in construction.

Some of these known filter presses have a preliminary dewatering section, that is to say a straining section. In other cases the material on the filter belt is given a preliminary dewatering by squeezing between pressure rollers, before it reaches the rotary drum. But all the known filter presses of this kind have the disadvantage that filtering efficiency is comparatively low, the construction is complex and the machine occupies a great deal of space.

The aim in the present invention is to provide a new filter press which is comparatively inexpensive to construct and occupies comparatively little space but which nevertheless provides a high and yet controllable filtering efficiency, the press being suitable in particular for processing sewage sludge. In solving this problem the invention starts out from a filter press of the known kind with two endless filter belts which contain the sludge between them, the two belts circulating together, guided in concentric paths, around a rotary drum against which they are pressed by adjustable pressure rollers, so that the liquid phase is squeezed out of the sludge. The invention is characterized essentially in that the two filter belts travel, before reaching the rotary drum, along horizontal sections situated above the drum, the sludge being pre-treated in these sections, retained between the two filter belts, before passing around the drum. Of these horizontal sections, the first can take the form of a horizontal filter belt onto which sludge is deposited by a distributor, the filter belt acting as a strainer for removing a first fraction of the liquid phase under gravity. Just downstream of this section the filter belt can, according to the invention, pass over a vibrator which appies adjustable oscillations to the filter belt.

Downstream of the vibrator the two filter belts form a wedge-shaped feed inlet and just downstream of this the two filter belts, containing the sludge between them, pass along a horizontal pressure section between pressure rollers.

Downstream of the horizontal pressure section the two filter belts, containing the sludge between them, circulate together around the rotary drum, the belts preferably running onto the drum at the highest point thereof. On leaving the drum the two filter belts preferably rise over a certain distance, so as to allow the liquid which has last been squeezed out of the material to run off downwardly.

A particularly effective dewatering action is obtained by constructing the drum as a rotary roller cage. This has the advantage, in a filter press according to the invention, that the sludge circulating between the filter belts around the rotary drum is worked or "kneaded" by squeezing thrusts applied sequentially in different directions between the rollers of the rotary roller cage and the external pressure rollers, producing a particularly good dewatering effect.

In the filter press according to the invention the dewatering therefore takes place in a sequence of five stages, the material being worked in each stage in a manner suited to its condition on leaving the previous stage. The five stages are essentially as follows. In the first stage the material, spread out over the surface of the first filter belt, is allowed to drain under gravity without the application of pressure. This is followed by a vibration stage, after which the material enters the wedge-shaped feed inlet and then passes along the horizontal pressure section. Finally the material is kneaded and pressed, between the filter belts, on its way around the asynchronous rotary roller cage. The raw material is assumed to be a watery sludge capable of flowing very easily. On its way through the press the material gradually loses water and becomes stiffer. Finally it is pressed to form a hard filter cake and kneaded to remove residual water. The more intense the kneading action the less water remains in the final hard filter cake. A particularly important proposal according to the invention is to support each filter belt by means of a supporting belt of greater mechanical strength, so that a higher squeezing pressure can be applied. In accordance with the invention it is assumed that the filter belts are made of a fine-mesh fabric consisting of very thin threads in order to obtain a high filtering effect. The mesh width may be, for example, 10–100 microns, depending on the nature of the sludge. For example a Perlon fabric can be used, or a combination fabric made of Perlon threads and V4a wire, or it can be a purely wire fabric made of V4a wire. When a high pressure combined with a kneading action is applied to a filter belt of this kind this can involve a high rate of abrasion and a risk of rupturing the fabric. According to the invention the high applied stresses are taken by the support belts, which for example can consist of chain wires spaced 5mm apart with woven-in steel crossbars of 1.5–2.5mm diameter spaced apart so as to leave mesh openings approximately 5 × 15 mm in area.

It is preferable, according to the invention, to drive only the two supporting belts, the filter belts themselves not being directly driven but merely entrained by the supporting belts.

In regard to the amount of space occupied by the press, the five sequential process stages between them require of course a considerable length of filter belt. But the filter press according to the invention is nevertheless compact in construction, because the three first sections, that is to say the dewatering by draining section, the vibrator section and the horizontal pressure section, are all situated over the rotary drum. Furthermore, according to the invention the sludge distributor which spreads the sludge rapidly right across the filter belt immediately produces a layer of sludge of even thickness extending over the full width of the filter belt. The entire available filtering surface is therefore fully utilized, giving the highest possible performance. The technical advance provided by the invention is demonstrated by the fact that compared to known filter presses occupying the same amount of space the filter press according to the invention provides a 50% greater effective filtering surface. The filtering efficiency is higher than anything hitherto obtainable, due to the application of a sequence of five processing stages. The filter cake produced is drier than any hitherto obtained. The drying effect is of the order of that of a chamber filter press, but is obtained at much lower constructional cost.

Figure 2:
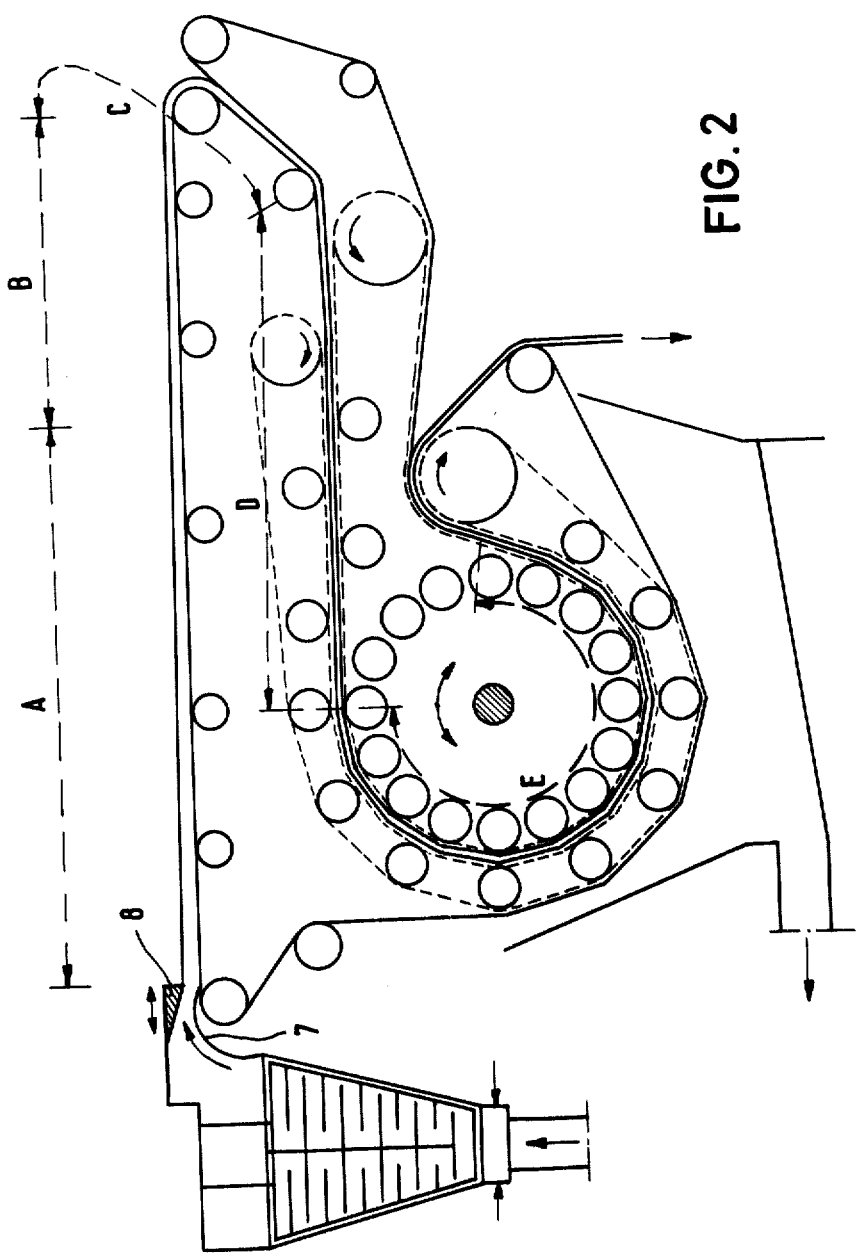
Figure 3:
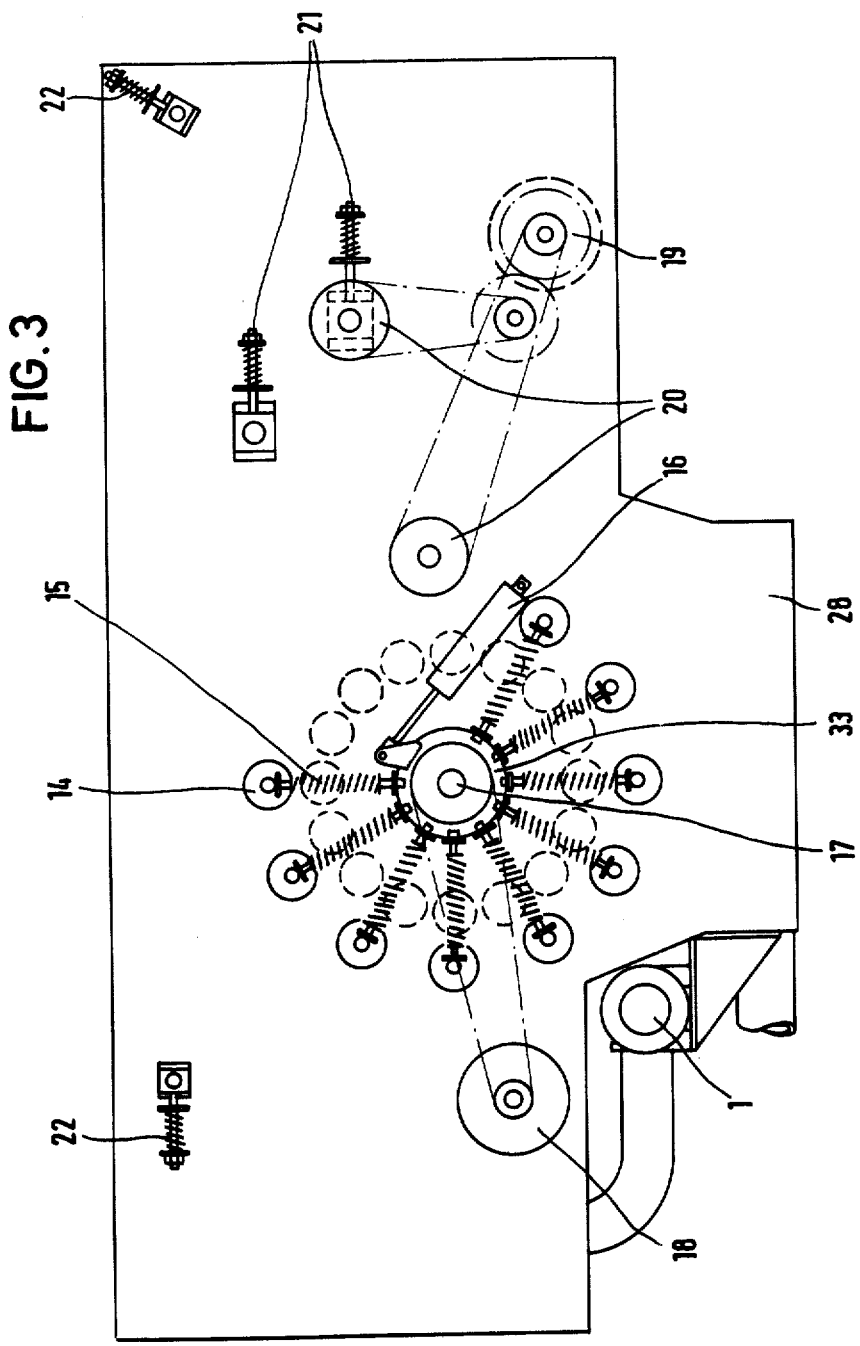
Figure 4:
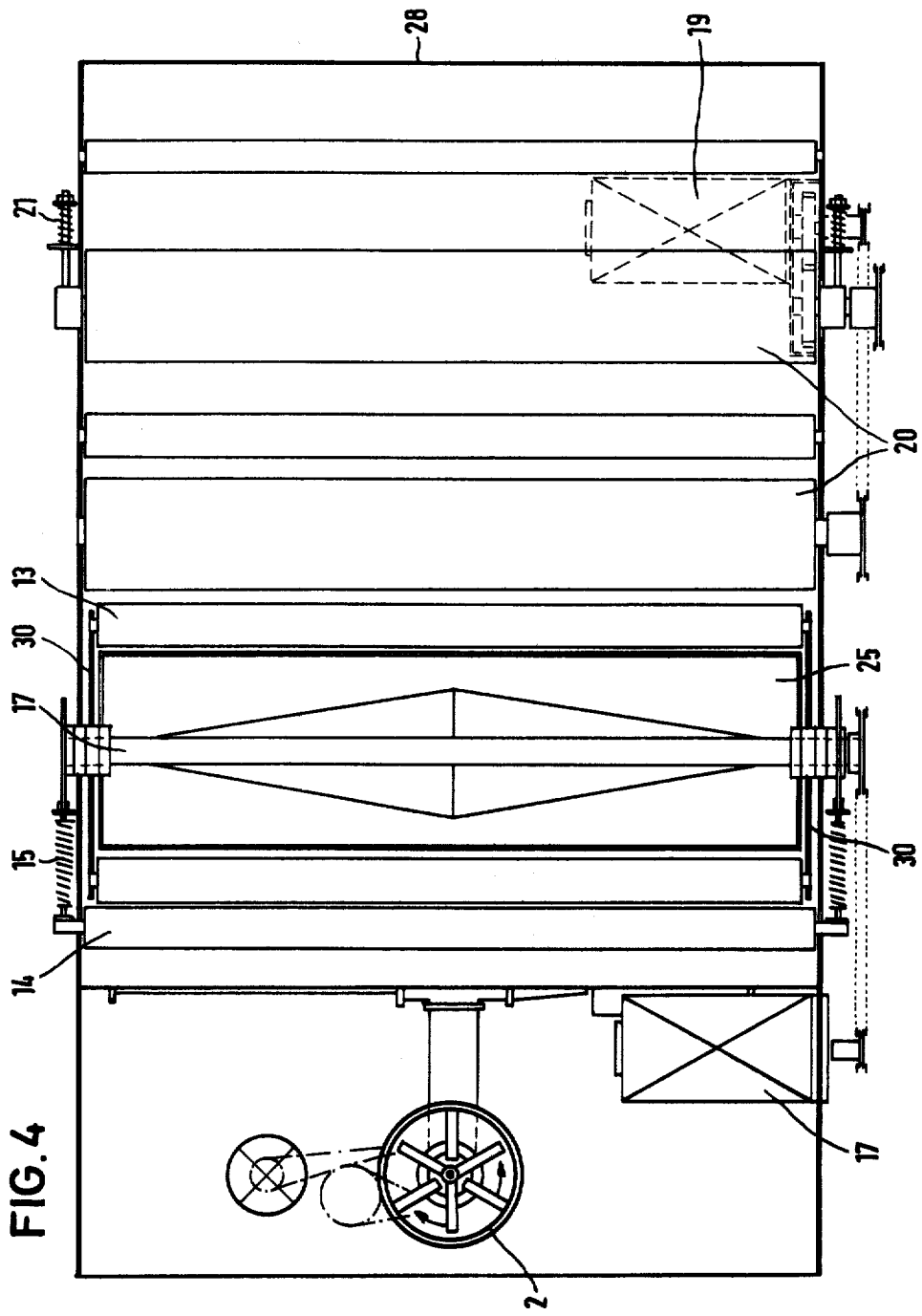
Figure 5:
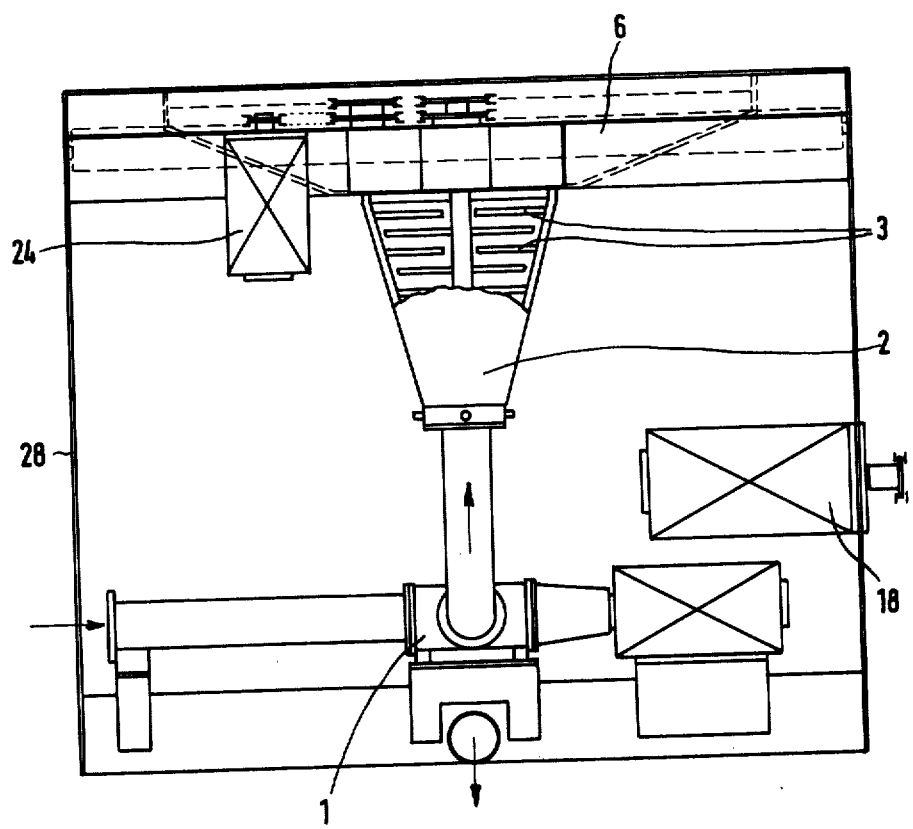
Figure 6:
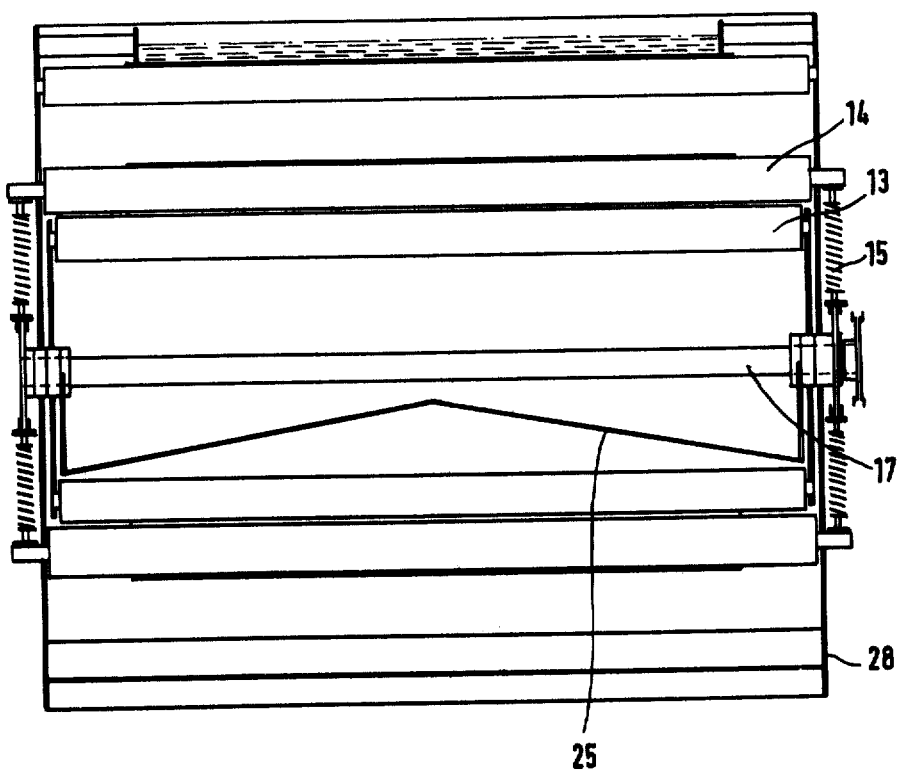

The invention will now be described in greater detail with reference to the example illustrated in the drawings, in which:

FIG. 1 is a longitudinal section through a movingbelt filter press according to the invention, FIG. 2 is an operating diagram of the press in accordance with FIG. 1, FIG. 3 is a side view of the filter press, FIG. 4 is a plan view of the filter press shown in FIG. 1 partly in section, FIG. 5 is an end view partly in section showing the filter press of FIG. 1 as seen from the left, FIG. 6 is a cross section taken along the line VI—VI in FIG. 1.

A sludge dispenser pump 1 feeds the raw sludge to a mixing chamber 2 containing a stirrer 3 which is driven through a hollow shaft 4. A flocculant is fed through the hollow shaft 4 and outward through nozzles 5 in the ends of three stirrer arms of the hollow shaft, into the mixing chamber 2, where it is mixed with the raw sludge. The resulting mixture rises from the mixing chamber 2 into a reaction chamber 6 from where it passes over a wide overflow edge 7 which distributes the mixture, consisting of sludge and flocculant, onto the surface of an outer filter belt 9, the thickness of the layer being controlled by a regulator blade 8. From the overflow edge 7 the mixture is conveyed horizontally by the moving filter belt 9 through the two processing sections indicated as A and B in FIG. 2, the belt being supported by rollers 29. In Section B the belt passes over a vibrator 23, of conventional construction, which applies controlled oscillations to the belt.

At the end of horizontal Section B the filter belt is deflected downwardly by a roller 29, the filter belt 9 now forms the upper wall of the wedge-shaped feed inlet C (FIG. 2). The lower wall of the wedge is formed by the second moving filter belt 10. From now onwards the material is therefore retained between these two filter belts 9 and 10. From the wedge-shaped feed inlet C the material is conveyed along the horizontal pressure section D, as indicated in FIG. 2. In the horizontal pressure section D a considerable quantity of the liquid phase is squeezed out of the material by pressure applied from above and below to the two filter belts 9 and 10, from below by support rollers 33 and from above by pressure rollers 34, the liquid phase passing out through the filter belts 9 and 10. Downstream of this section, in the region of the roller cage, the pressure rollers 14 are spring-loaded by springs 15.

To facilitate the application of pressure, for squeezing the liquid phase out of the material, the two filter belts 9 and 10, which are made of fine-mesh woven wire fabric, are supported by an outer support below 11 and an inner support belt 12. The two support belts are constructed so as to be able to withstand very high pressure loads. For example they can be made of longitudinal chain wires across which steel cross-bars are woven-in.

Tensioning devices for the support belts 11 and 12 are shown at 21 and for the filter belts 9 and 10 at 22.

Downstream of the horizontal pressure section D all four belts pass over a rotary drum which in the present example, is in the form of a rotary roller cage 13 driven by a motor 18 by means of a drive shaft 17. The drive shaft 17, with the roller cage 13, can rotate in either direction, for example it can if desired rotate in the direction opposite to the direction of movement of the belts. As shown in FIG. 4, the rollers 13 of the roller cage can rotate in bearings in cheek plates 30 fixed to the drive shaft 17.

Preferably, in accordance with the invention, only the two support belts 11 and 12 are directly driven, and that by a drive motor 19 and driving drums 20, and as they move they carry along the outer and inner filter belts 9 and 10, which are not themselves directly driven.

The pressure applied to the four belts 9 to 12, in the pressure-dewatering sections, is adjusted by adjusting the springs 15. The springs are adjusted so that the pressure applied by the rollers 14 increases progressively in the downstream direction, so as to increase the dewatering pressure progressively. The roller cage 13 should rotate asynchronously, in relation to the linear speed of the four belts 9–12. The effect obtained is that with rotation of the roller cage 13 the outer, stationary pressure rollers 14 enter intermittently into the gaps between the individual rollers of the roller cage, applying an undulating squeezing thrust to the material between the two filter belts, in order to work the material and squeeze out as much of the liquid phase as possible.

During the entire process, that is to say all the way along the path followed by the material, the liquid squeezed out is caught by gutters 25 positioned under the belts and inside the roller cage 13. It is a characteristic of the present invention that the liquid is effectively caught by gutters and removed from the moving-belt filter press. In particular it is ensured that squeezed out liquid cannot flow back into the sludge again, as occurs in known moving-belt filter presses of the same general kind. All the squeezed-out liquid leaves the press through a drain 31, while the solid material is ejected at 32.

Spray jets are shown at 26 for washing the filter belts 9 and 10 before they are again loaded with sludge.

As shown in the drawing, the two filter belts 9 and 10 move upwardly after leaving the roller cage 13, allowing pressed out liquid to flow back, away from the filter cake.

With reference particularly to FIG. 2, which represents the arrangement diagrammatically, it will be seen that the filter belt 9 first of all conveys the material over a horizontal preliminary dewatering section A, and then over a vibrator section B. The sludge, deposited by the distributor device 7, 8 in the form of a wide band of even thickness onto the filter belt 9 is therefore first given a dewatering without pressure, while the liquid at first drains out under gravity through the filter belt 9. In the vibrator section B the gravity-draining effect is intensified by the vibration.

In the vibrator section B an electromagnetic vibrator 23, acting by way of two support rollers 29, applies vertical oscillations to the filter belt 9. Due to the gravity difference between liquid and sludge more rapid separation of the liquid from the sludge is obtained. Thus, the vibration intensifies the gravity effect.

After leaving the vibrator section B, the material enters the wedge-shaped feed inlet section C, where it is progressively squeezed, under gradually increasing pressure, between the two filter belts 9 and 10.

In the subsequent horizontal pressure section D the material is increasingly squeezed between the two filter belts, which are now supported by the two support belts 11 and 12, pressure being applied increasingly by the upper and lower pressure rollers.

Finally, after the horizontal pressure section D, the material enters the circular kneading section E. The sludge entering this section is already solid enough so that it cannot flow, and accordingly a comparatively high pressure can be applied and the material can be kneaded, or squeezed and worked by an undulating action. It should be observed that this undulating action is obtained by running the roller cage 13 at an entirely different linear speed compared to the movement of the belts 9-12, that is to say the cage 13 is operated asynchronously. The pressure applied to the belts by the individual spring-loaded pressure rollers 14 increases progressively along the kneading section E, due to the fact that the springs 15 are adjusted to press the individual rollers 14 with increasing force against the belts. The kneading action, due to the asynchronous movements, in conjunction with the progressively increasing pressure, ensures that each sludge particle in the material is subjected to an oscillating but gradually increasing pressure on its way through this section. The intense pressing and kneading of the material in this section is made possible by the use of support belts 11, 12. The filter belts 9 and 10 themselves would not be capable of withstanding the resulting very high compressive, tensile and bending stresses.

Referring now to the side view of the press shown in FIG. 3, it will be seen that the springs 15 for the pressure rollers 14 are preferably situated outside the side walls 28 of the filter press. An adjustment device 16 acting by way of a rotatable adjustment ring 33 allows the springs to be adjusted centrally, although as already mentioned, each individual spring 15 is adjusted so as to increase the applied pressure progressively in the downstream direction around the roller cage 13.

The arrangements described allow the press to be constructed in a very compact manner, the sludge being nevertheless dewatered in a stepped-up sequence of pressing and filtering operations.

Having now described my invention with reference to the accompanying drawings, what I desire to protect by letters patent is set forth in the following claims.

I claim:

1. Filter press, particularly for dewatering sludge in sewage treatment plants, comprising two endless filter belts that retain the sludge between them, said two filter belts circulating simultaneously and being guided in concentric paths around a rotary drum against which they are held by adjustable pressure rollers in a manner that the liquid phase is squeezed out of the sludge, said two filter belts travelling along horizontal sections situated above the drum before reaching said rotary drum, the sludge being pre-treated in these sections before entering between the two filter belts around the drum.

2. Apparatus according to claim 1, where the first horizontal section has a distributing device for depositing a layer of sludge onto the filter belt, said section constituting a preliminary dewatering section defining a preliminary strainer.

3. Apparatus according to claim 2, characterized in that a vibrator is disposed downstream of the preliminary dewatering section.

4. Apparatus in accordance with claim 3, where a wedge-shaped feed inlet section is formed downstream of the vibrator between said two filter belts.

5. Apparatus in accordance with claim 4, comprising pressure rollers downstream of the wedge-shaped feed inlet section adapted to guide said two filter belts along a horizontal pressure section.

6. Apparatus in accordance with claim 5, comprising a rotary drum and pressure rollers disposed around said drum downstream of said horizontal pressure section and said filter belts travel around said rotary drum between said drum and said pressure rollers.

7. Apparatus in accordance with claim 6, where said filter belts run onto said drum approximately at the highest point on the drum.

8. Apparatus in accordance with claim 7, where after leaving the drum the filter belts move upwardly.

9. Apparatus in accordance with claim 5, where said drum is in the form of a rotary roller cage.

10. Apparatus in accordance with claim 5, where said drum 13 is driven in rotation at a controlled speed and means are provided to reverse the direction of rotation.

11. Apparatus in accordance with claim 2, where each filter belt is supported by a supporting belt of higher mechanical strength.

12. Apparatus in accordance with claim 11, characterized in that the two supporting belts are power driven and entrain the two filter belts with them, the filter belts themselves not being directly driven.

* * * * *